US008681080B2

(12) United States Patent
Ina et al.

(10) Patent No.: US 8,681,080 B2
(45) Date of Patent: Mar. 25, 2014

(54) LIQUID CRYSTAL DISPLAY DEVICE

(75) Inventors: Keiichi Ina, Osaka (JP); Yoshimizu Moriya, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 208 days.

(21) Appl. No.: 13/393,799

(22) PCT Filed: Apr. 30, 2010

(86) PCT No.: PCT/JP2010/003081
§ 371 (c)(1),
(2), (4) Date: Mar. 1, 2012

(87) PCT Pub. No.: WO2011/039903
PCT Pub. Date: Apr. 7, 2011

(65) Prior Publication Data
US 2012/0154366 A1    Jun. 21, 2012

(30) Foreign Application Priority Data
Sep. 30, 2009    (JP) .................................. 2009-226182

(51) Int. Cl.
*G09G 3/36*    (2006.01)

(52) U.S. Cl.
USPC ............................................. 345/87; 345/98

(58) Field of Classification Search
CPC . G09G 3/18; G09G 3/361; G09G 2300/0426; G09G 2300/0876; G02F 1/13; G02F 1/133
USPC ...................... 345/38, 55, 87, 90, 92, 98, 204; 349/139, 84
See application file for complete search history.

(56) References Cited

U.S. PATENT DOCUMENTS

| 5,946,058 | A |  | 8/1999 | Kamada et al. |  |
| 6,897,908 | B2 | * | 5/2005 | Lee et al. | 349/43 |
| 7,602,358 | B2 | * | 10/2009 | Tsubata et al. | 345/87 |
| 7,612,750 | B2 | * | 11/2009 | Iwamoto et al. | 345/87 |
| 7,791,078 | B2 | * | 9/2010 | Kim et al. | 257/72 |
| 7,796,104 | B2 | * | 9/2010 | Kim | 345/87 |
| 7,936,429 | B2 | * | 5/2011 | Ono et al. | 349/141 |
| 8,144,280 | B2 | * | 3/2012 | Lee et al. | 349/44 |

(Continued)

FOREIGN PATENT DOCUMENTS

| JP | H5-273593 | A | 10/1993 |
| JP | 9-96839 | A | 4/1997 |

(Continued)

*Primary Examiner* — Joe H Cheng
(74) *Attorney, Agent, or Firm* — Chen Yoshimura LLP (57) ABSTRACT

A liquid crystal display device (1) includes a plurality of source bus lines (14), a plurality of gate bus lines (11) that cross the plurality of source bus lines (14), and a plurality of auxiliary capacitance lines (29) that extend in parallel with the gate bus lines (11). The liquid crystal display device (1) also includes a plurality of pixels (30) to (32) that respectively include TFTs (5), pixel electrodes (19), a common electrode (24), and a liquid crystal layer (4) and that are arranged in a matrix so as to correspond to the respective intersections of the gate bus lines (11) and the source bus lines (14). A pixel electrode (19a) for the pixel (31) is disposed in the pixel (30) that is adjacent to the pixel (31), and in a plan view, the gate bus line (11b) disposed in the pixel (31) and the pixel electrode (19a) for the pixel (31) are arranged apart from each other so as not to overlap.

2 Claims, 8 Drawing Sheets

(56) References Cited

U.S. PATENT DOCUMENTS

| | | | |
|---|---|---|---|
| 8,279,389 B2* | 10/2012 | Lee | 349/140 |
| 2004/0169798 A1 | 9/2004 | Iwasa | |
| 2004/0178977 A1* | 9/2004 | Nakayoshi et al. | 345/87 |
| 2005/0168678 A1* | 8/2005 | Andou et al. | 349/145 |
| 2007/0008263 A1* | 1/2007 | Kim | 345/87 |
| 2009/0033820 A1* | 2/2009 | Lee et al. | 349/46 |
| 2009/0128533 A1* | 5/2009 | Tsubata | 345/209 |
| 2009/0190082 A1* | 7/2009 | Lee et al. | 349/147 |
| 2010/0060806 A1* | 3/2010 | Ina et al. | 348/791 |
| 2010/0207914 A1 | 8/2010 | Kaise et al. | |
| 2010/0225831 A1* | 9/2010 | Takeuchi et al. | 348/739 |
| 2011/0175884 A1* | 7/2011 | Ono | 345/211 |
| 2011/0216249 A1* | 9/2011 | Tsubata | 348/731 |
| 2012/0274889 A1* | 11/2012 | Sugisaka et al. | 349/139 |

FOREIGN PATENT DOCUMENTS

| | | |
|---|---|---|
| JP | 2002-156644 A | 5/2002 |
| JP | 2004-264534 A | 9/2004 |
| WO | 2009/057350 A1 | 5/2009 |

* cited by examiner

LIQUID CRYSTAL DISPLAY DEVICE

TECHNICAL FIELD

The present invention relates to an active matrix type liquid crystal display device that uses a switching element such as a thin film transistor.

BACKGROUND ART

In recent years, an active matrix type liquid crystal display device that has advantages such as thin-profile, light-weight, low drive voltage, and low power consumption has been widely used as a display panel for various electronic devices such as mobile terminal devices including mobile phones, portable gaming devices, and the like or laptop computers.

A primary part of such an active matrix type liquid crystal display device includes a liquid crystal display panel as a display section that is constituted of a plurality of pixels that are arranged in a matrix, and a driver circuit therefor. In the liquid crystal display panel, a plurality of data signal lines (hereinafter referred to as "source bus lines") and a plurality of scanning signal lines (hereinafter referred to as "gate bus lines") are disposed so as to cross each other in a lattice pattern. Further, a plurality of auxiliary capacitance lines are disposed so as to extend in parallel with the plurality of gate bus lines. At each of the intersections of the plurality of source bus lines and the plurality of gate bus lines, one corresponding pixel is provided. The liquid crystal display panel also includes a common electrode (or an opposite electrode) that is commonly disposed for the plurality of pixels arranged in a matrix and that faces pixel electrodes provided in the respective pixels through a liquid crystal layer.

Figure 11:
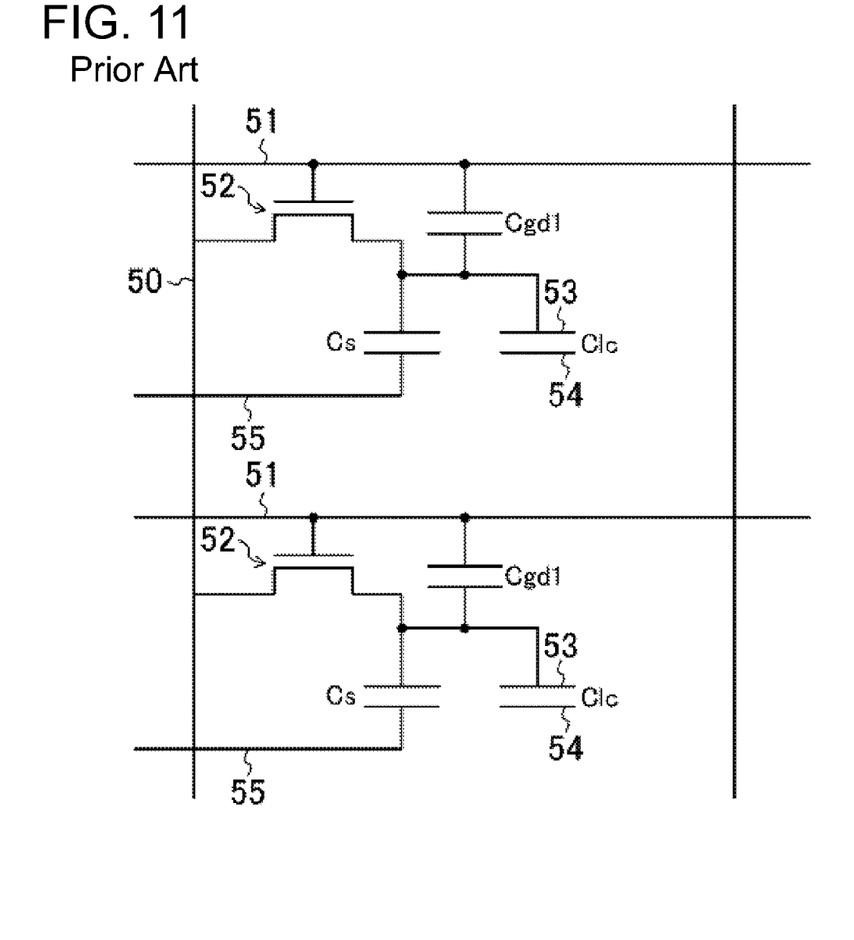
FIG. 11 is an equivalent circuit diagram showing an electrical configuration of a pixel in a conventional liquid crystal display device.

FIG. 11 is an equivalent circuit diagram showing an electrical configuration of two adjacent pixels in a liquid crystal display panel of a liquid crystal display device configured in a manner described above. Each pixel includes a thin film transistor (hereinafter abbreviated as "TFT") 52 as a switching element and a pixel electrode 53 connected to the drain electrode of the TFT 52. The source electrode of the TFT 52 is connected to the source bus line 50 that passes through an intersection corresponding thereto, and the gate electrode is connected to the gate bus line 51 that passes through the same intersection. A liquid crystal capacitance $C_{1c}$ is formed by the pixel electrode 53 and the common electrode 54. An auxiliary capacitance $C_s$ is formed by the pixel electrode 53 and the auxiliary capacitance line disposed along the gate bus line 51.

These liquid crystal capacitance $C_{1c}$ and auxiliary capacitance $C_s$ form a pixel capacitance that holds a voltage that indicates a value of a pixel to be formed by each pixel. Also, in each pixel, a parasitic capacitance $C_{gd1}$ is formed between the pixel electrode 53 for the pixel and the gate bus line 51.

Because of the parasitic capacitance $C_{gd1}$ formed between the gate bus line 51 and the pixel electrode 53 in each pixel, when a data signal is applied to the source bus line 50, and when a voltage of a scanning signal is lowered from an ON voltage $V_{gh}$ of the gate bus line 51 to an OFF voltage $V_{g1}$ of the gate bus line 51, a level shift $\Delta V_d$ caused by the parasitic capacitance $C_{gd1}$ is generated in a potential (pixel potential) $V_d$ of the pixel electrode 53. This level shift $\Delta V_d$ is referred to as "feed-through voltage," "lead-in voltage", or the like. The feed-through voltage $\Delta V_d$ is represented by the following formula:

$$\Delta V_d = (V_{gh} - V_{g1}) \cdot C_{gd1} / (C_{1c} + C_s + C_{gd1}) \quad (1)$$

Such a feed-through voltage $\Delta V_d$ causes flickering, quality degradation, and the like in a displayed image. Generally, in a liquid crystal display panel driven by TFTs, an asymmetric voltage applied to a liquid crystal layer causes flickering, thereby significantly lowering the display quality. It also causes image burn-in when left uncontrolled for a long period of time.

A liquid crystal display device for solving this problem has been proposed. Specifically, a liquid crystal display device that includes groups of wiring lines arranged in a matrix, a plurality of active elements, and a liquid crystal layer and that is configured such that conductive layers maintained at a prescribed potential are selectively disposed around pixel electrodes provided for the respective pixels has been disclosed. The disclosure describes that according to such a configuration, parasitic capacitances between the pixel electrodes and the gate bus lines can be reduced, and therefore, a swing of a voltage applied to the liquid crystal layer becomes smaller, resulting in the improvement of the picture quality (see Patent Document 1, for example).

RELATED ART DOCUMENTS

Patent Documents

Patent Document 1: Japanese Patent Application Laid-Open Publication No. H5-273593

SUMMARY OF THE INVENTION

Problems to be Solved by the Invention

However, the liquid crystal display device described in Patent Document 1 above had a problem in that because the conductive layers need to be disposed around the pixel electrode to reduce the parasitic capacitances, the aperture ratio is reduced by the conductive layer regions, and as a result, the performance of the liquid crystal display device is lowered.

Also, because the conductive layers need to be disposed separately, it caused another problem of making the manufacturing process more complex and increasing the cost.

The present invention was made in view of the above-mentioned problems. It is an object of the present invention to provide a liquid crystal display device that can prevent degradation in display quality caused by flickering without reducing the aperture ratio or increasing the cost.

Means for Solving the Problems

In order to achieve the above-mentioned object, a liquid crystal display device according to the present invention includes: a plurality of data signal lines; a plurality of scanning signal lines that cross the plurality of data signal lines; a plurality of auxiliary capacitance lines that extend in parallel with the scanning signal lines; a plurality of pixels each including a switching element that turns to an ON state when the scanning signal line is in a selected state and that turns to an OFF state when the scanning signal line is in a non-selected state, and a pixel electrode connected to the data signal line through the switching element, the plurality of pixels being arranged in a matrix so as to correspond to respective intersections of the plurality of data signal lines and the plurality of scanning signal lines, a common electrode disposed so as to face the pixel electrodes, and a liquid crystal layer sandwiched by the pixel electrodes and the common electrode. In the liquid crystal display device according to the present invention, the pixel electrode for a first pixel among the plurality of pixels is disposed in a second pixel that is adjacent to the first pixel, and the scanning signal line disposed in the first pixel and the pixel electrode for the first pixel are disposed apart from each other so as not to overlap in a plan view.

According to this configuration, a parasitic capacitance between the pixel electrode for the first pixel and the scanning signal line disposed in the first pixel can be reduced, allowing for a reduction in a feed-through voltage of the pixel electrode for the first pixel. This makes it possible to prevent degradation of display quality caused by flickering.

The present invention differs from the above-mentioned conventional technique in that there is no need to form conductive layers around the pixel electrodes, and it only requires a modification to wiring lines in the pixels. This makes it possible to prevent degradation of display quality caused by flickering without reducing the aperture ratio or increasing the cost.

The liquid crystal display device according to the present invention may also be configured such that a relationship represented by $d_1 > d_2$ is satisfied, where $d_1$ is a distance between the scanning signal line disposed in the first pixel and the pixel electrode disposed in the second pixel, and $d_2$ is a distance between the scanning signal line disposed in the first pixel and the pixel electrode disposed in the first pixel.

According to this configuration, the parasitic capacitance between the pixel electrode for the first pixel and the scanning signal line disposed in the first pixel can be reliably reduced. This makes it possible to reliably reduce the feed-through voltage of the pixel electrode for the first pixel.

The liquid crystal display device according to the present invention may also be configured such that the auxiliary capacitance lines are disposed between the pixels, respectively.

Another liquid crystal display device according to the present invention includes: a plurality of data signal lines; a plurality of scanning signal lines that cross the plurality of data signal lines; a plurality of auxiliary capacitance lines that extend in parallel with the scanning signal lines; a plurality of pixels each including a switching element that turns to an ON state when the scanning signal line is in a selected state and that turns to an OFF state when the scanning signal line is in a non-selected state, and a pixel electrode connected to the data signal line through the switching element, the plurality of pixels being arranged in a matrix so as to correspond to respective intersections of the plurality of data signal lines and the plurality of scanning signal lines, a common electrode disposed so as to face the pixel electrodes, and a liquid crystal layer sandwiched by the pixel electrodes and the common electrode. In another liquid crystal display device according to the present invention, the scanning signal lines are disposed between the pixels, respectively, and areas where each scanning signal line overlap the respective pixel electrodes of the two pixels adjacent to the scanning signal line differ from each other in a plan view.

According to this configuration, a parasitic capacitance between the pixel electrode of the first pixel and the scanning signal line disposed for the first pixel can be reduced, allowing for the reduction in a feed-through voltage of the pixel electrode for the first pixel. This makes it possible to prevent degradation of display quality caused by flickering.

The present invention differs from the above-mentioned conventional technique in that there is no need to provide conductive layers around the pixel electrodes, and it only requires a modification to wiring lines in the pixels. This makes it possible to prevent degradation of display quality caused by flickering without reducing the aperture ratio or increasing the cost.

Another liquid crystal display device according to the present invention may also be configured such that a relationship represented by $S_1 < S_2$ is satisfied, where $S_1$ is an area where the scanning signal line disposed for a first pixel among the plurality of pixels overlaps the pixel electrode disposed in the first pixel, and $S_2$ is an area where the scanning signal line disposed for the first pixel overlaps the pixel electrode disposed in a second pixel adjacent to the first pixel.

According to this configuration, the parasitic capacitance between the pixel electrode for the first pixel and the scanning signal line disposed for the first pixel can be reliably reduced. This makes it possible to reliably reduce the feed-through voltage of the pixel electrode of the first pixel.

Effects of the Invention

According to the present invention, because the feed-through voltage of the pixel electrode can be reduced, degradation of display quality caused by flickering can be prevented. Also, degradation of display quality caused by flickering can be prevented without reducing the aperture ratio or increasing the cost.

DETAILED DESCRIPTION OF EMBODIMENTS

Embodiments of the present invention will be explained below in detail with reference to figures. It should be noted that the present invention is not limited to such embodiments.

Embodiment 1

Figure 1:
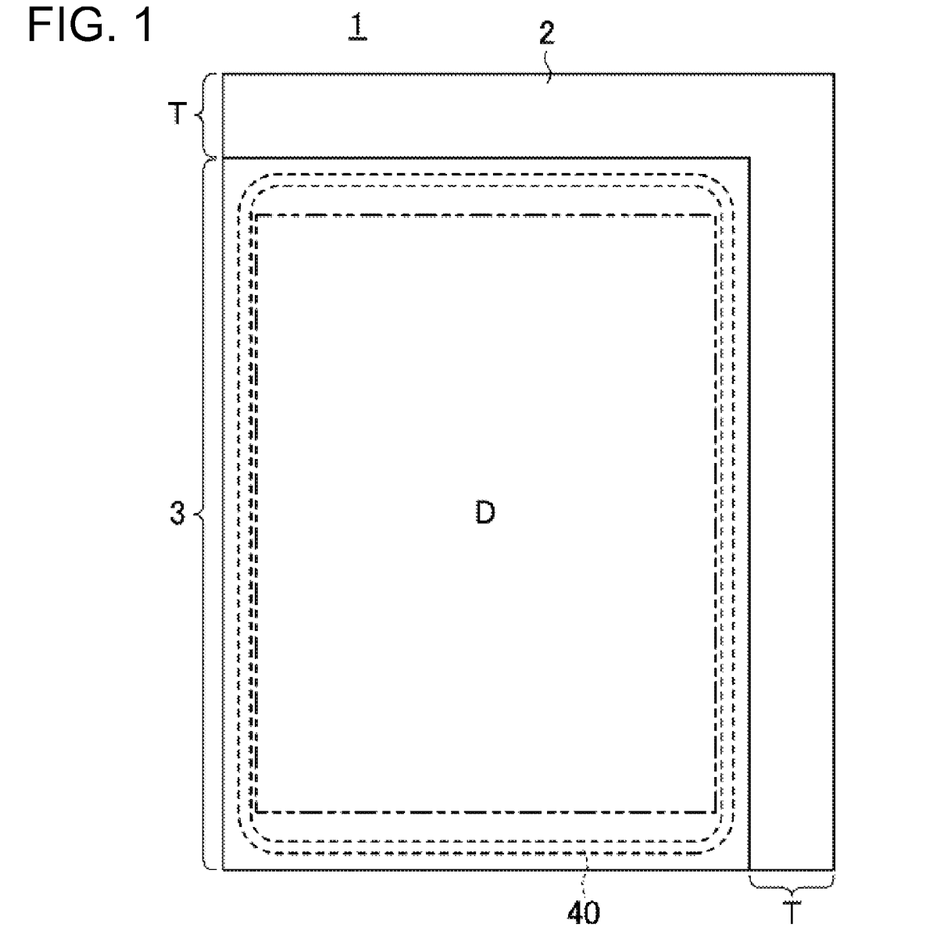
FIG. 1 is a plan view showing an overall configuration of a liquid crystal display device according to Embodiment 1 of the present invention.
Figure 2:
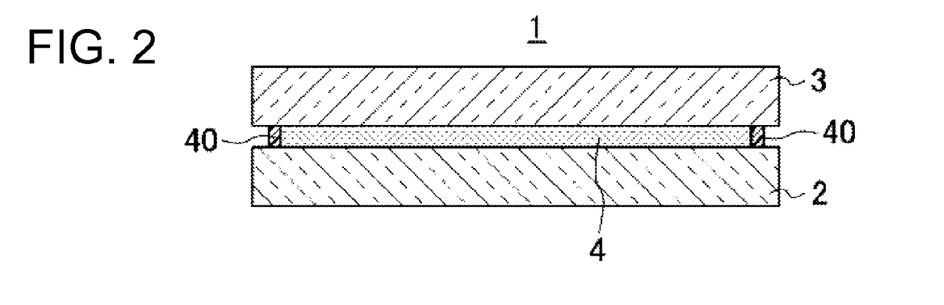
FIG. 2 is a cross-sectional view of the liquid crystal display device according to Embodiment 1 of the present invention.
Figure 3:
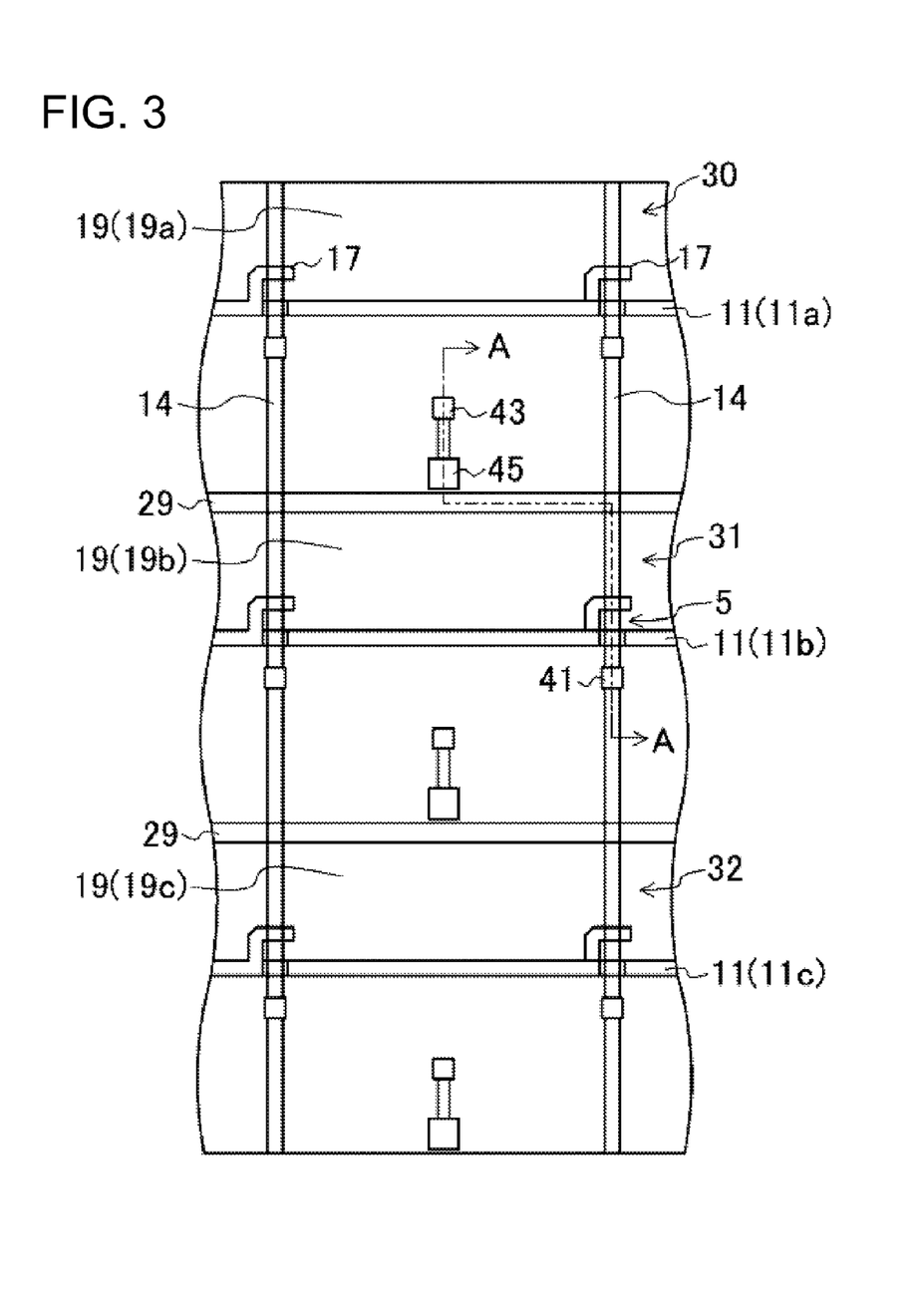
FIG. 3 is a plan view showing adjacent pixels in the liquid crystal display device according to Embodiment 1 of the present invention.
Figure 4:
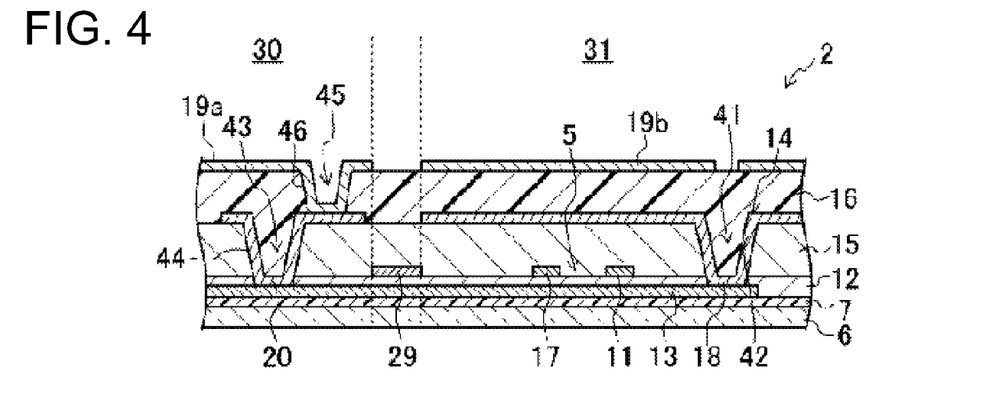
FIG. 4 is a cross-sectional view along the line A-A in FIG. 3.
Figure 5:
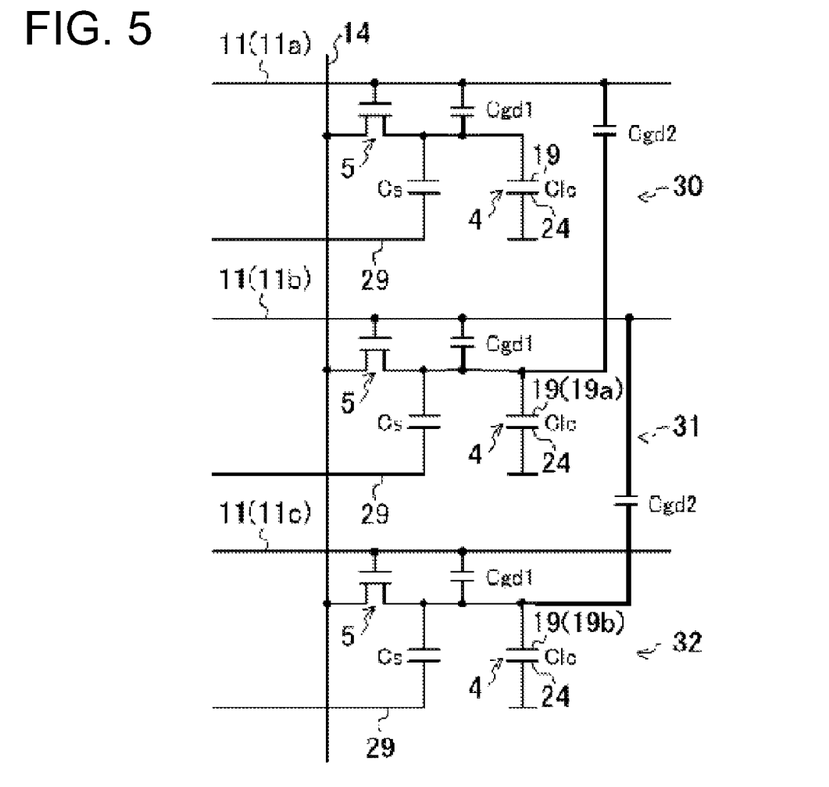
FIG. 5 is an equivalent circuit diagram showing an electrical configuration of adjacent pixels in the liquid crystal display device according to Embodiment 1 of the present invention.
Figure 6:
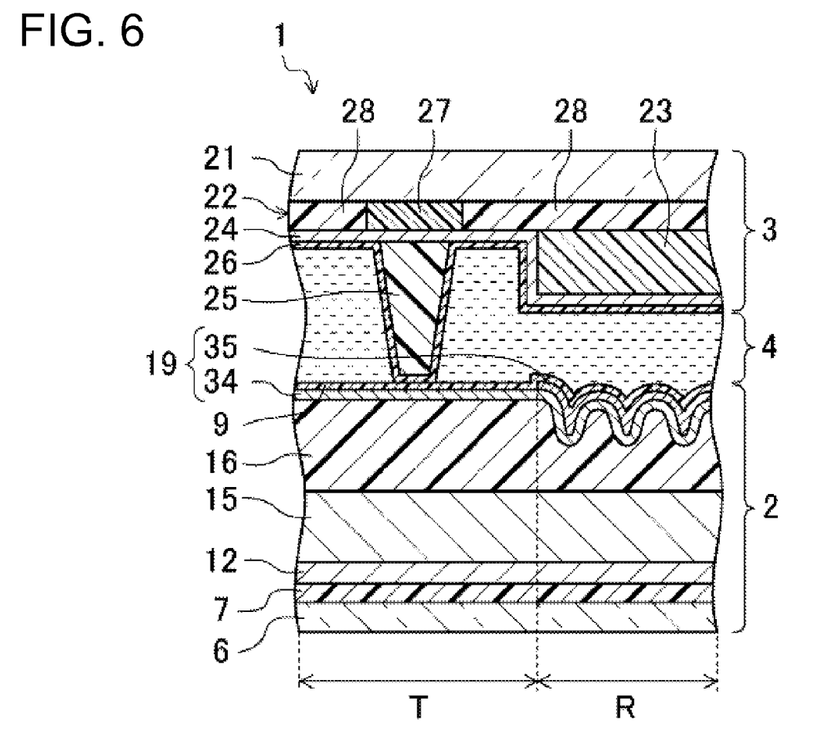
FIG. 6 is a cross-sectional view showing an overall configuration of a display section of the liquid crystal display device according to Embodiment 1 of the present invention.
Figure 7:
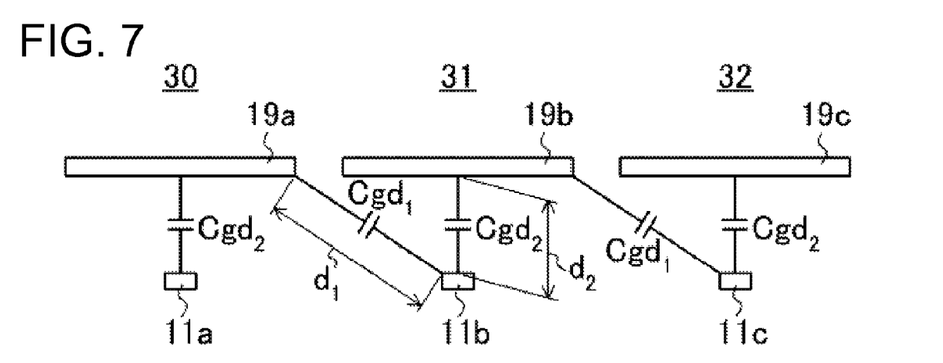
FIG. 7 is a diagram for explaining a distance relationship between a pixel electrode and a gate bus line in the liquid crystal display device according to Embodiment 1 of the present invention.

FIG. 1 is a plan view showing an overall configuration of a liquid crystal display device according to Embodiment 1 of the present invention. FIG. 2 is a cross-sectional view of the liquid crystal display device according to Embodiment 1 of the present invention. FIG. 3 is a plan view showing adjacent pixels in the liquid crystal display device according to Embodiment 1 of the present invention. FIG. 4 is a cross-sectional view along the line A-A in FIG. 3. FIG. 5 is an equivalent circuit diagram showing an electrical configuration of adjacent pixels in the liquid crystal display device according to Embodiment 1 of the present invention. FIG. 6 is a cross-sectional view showing an overall configuration of a display section of the liquid crystal display device according to Embodiment 1 of the present invention. FIG. 7 is a diagram for explaining a distance relationship between pixel electrodes and gate bus lines in the liquid crystal display device according to Embodiment 1 of the present invention.

As shown in FIGS. 1 and 2, a liquid crystal display device 1 includes a TFT substrate 2 as a first substrate, a CF substrate 3 as a second substrate disposed so as to face the TFT substrate 2, a liquid crystal layer 4 as a display medium layer sandwiched between the TFT substrate 2 and the CF substrate 3, and a sealing material 40 that is sandwiched between the TFT substrate 2 and the CF substrate 3 and that is disposed in a frame shape so as to bond the TFT substrate 2 and the CF substrate 3 together and seal the liquid crystal layer 4.

This sealing material 40 is formed so as to enclose the liquid crystal layer 4, and the TFT substrate 2 and the CF substrate 3 are bonded to each other through this sealing material 40. The liquid crystal display device 1 is provided with a plurality of photo spacers (not shown) for controlling a thickness of the liquid crystal layer 4 (that is, a cell gap).

As shown in FIG. 1, the liquid crystal display device 1 is formed in a rectangular shape. The TFT substrate 2 protrudes outside of the CF substrate 3 in the horizontal direction of the liquid crystal display device 1, and in the protruding region, a plurality of display wiring lines such as gate bus lines and source bus lines that will be later described are led out, and are forming a terminal region T.

In the liquid crystal display device 1, a display region D that displays an image is defined in a region where the TFT substrate 2 and the CF substrate 3 overlap. The display region D is constituted of a plurality of pixels arranged in a matrix. Each pixel is the smallest unit of picture.

As shown in FIG. 1, the sealing material 40 is disposed in a rectangular frame shape so as to enclose the entire display region D.

As shown in FIGS. 3 to 5, in a respective plurality of pixels 30 to 32 provided in the liquid crystal display device 1, source bus lines 14 and gate bus lines 11 are disposed so as to cross each other.

Thin film transistors (TFTs) 5 are provided as switching elements. In each of the TFTs 5, the gate is connected to the gate bus line 11 near an intersection of the two signal lines, the source is connected to the source bus line 14 near the same intersection, and the drain is connected to a pixel electrode 19. The TFT 5 turns to an ON state when the gate bus line 11 is in a selected state, and turns to an OFF state when the gate bus line 11 is in a non-selected state.

The pixel electrodes 19 disposed in the respective plurality of pixels 30 to 32 are connected to the source bus lines 14 through the TFTs 5, respectively. A common electrode (opposite electrode) 24 is arranged so as to face these pixel electrodes 19. A liquid crystal layer 4 as a display medium layer is sandwiched by the pixel electrodes 19 and the common electrode 24, forming liquid crystal capacitances $C_{lc}$, respectively. A plurality of auxiliary capacitance lines 29 are formed so as to extend in parallel with the plurality of gate bus lines 11, and an auxiliary capacitance Cs is formed in parallel with the liquid crystal capacitance $C_{lc}$. In this embodiment, as shown in FIG. 3, the auxiliary capacitance lines 29 are disposed between the respective adjacent pixels. In the auxiliary capacitance Cs, one of auxiliary capacitance electrodes is connected to the pixel electrode 19, and the other of the auxiliary capacitance electrodes is connected to the common electrode 24. A common voltage potential $V_{com}$ is applied to the common electrode 24. In the respective pixels 30 to 32, parasitic capacitances $C_{gd1}$ are formed between the pixel electrodes 19 and the gate bus lines 11.

Although FIG. 3 only shows a portion corresponding to the three adjacent pixels, the liquid crystal display device is provided with the plurality of source bus lines 14 and the plurality of gate bus lines 11, respectively, and the plurality of pixels 30 are arranged in a matrix so as to correspond to the respective intersections of the plurality of source bus lines 14 and the plurality of gate bus lines 11. That is, the respective pixels 30 to 32 are disposed in respective regions enclosed by the gate bus lines 11 and the source bus lines 14.

As shown in FIGS. 3 and 4, the TFT substrate 2 includes an insulating substrate 6 such as a glass substrate, a base coat layer 7 formed on the insulating substrate 6, a semiconductor layer 13 formed on the base coat layer 7, and a gate insulating film 12 formed so as to cover the semiconductor layer 13. The TFT substrate 2 also includes the above-mentioned gate bus lines 11 and the above-mentioned auxiliary capacitance lines 29 formed on the gate insulating film 12, a first interlayer insulating film 15 formed so as to cover the gate bus lines 11 and the auxiliary capacitance lines 29, and the above-mentioned source bus lines 14 formed on the first interlayer insulating film 15. The TFT substrate 2 further includes the above-mentioned TFTs 5 disposed at the respective intersections of the gate bus lines 11 and the source bus lines 14, a second interlayer insulating film 16 formed so as to cover the source bus lines 14 and the TFTs 5, and a plurality of pixel electrodes 19 that are arranged in a matrix on the second interlayer insulating film 16 and that are respectively connected to the TFTs 5.

As shown in FIGS. 3 and 4, each of the TFTs 5 includes the gate electrode 17 formed by the gate bus line 11 protruding to the side, and the source electrode 18 and the drain electrode 20 that are disposed so as to face each other on the semiconductor layer 13. The source electrode 18 is a portion of the source bus line 14 protruding to the side, and is connected to the semiconductor layer 13 through a contact hole 42 formed in the gate insulating film 12 and the first interlayer insulating film 15 in a contact portion 41. As shown in FIG. 4, the drain electrode 20 is connected to the semiconductor layer 13 through a contact hole 44 formed in the gate insulating film 12 and the first interlayer insulating film 15 in a contact portion 43. The drain electrode 20 is also connected to the pixel electrode 19 through a contact hole 46 formed in the second interlayer insulating film 16 in a contact portion 45.

As shown in FIG. 6, in the TFT substrate 2 and the display section of the liquid crystal display panel 1 including the TFT substrate 2, a reflective region R is defined by a reflective electrode 35, and a transmissive region T is defined by a transparent electrode 34 that is exposed from the reflective electrode 35. A surface of the second interlayer insulating film 16 disposed in a layer below the pixel electrode 19 has recesses and protrusions as shown in FIG. 6, and a surface of the reflective electrode 35 disposed on the surface of the second interlayer insulating film 16 through the transparent electrode 34 also has recesses and protrusions.

The above-mentioned reflective region R may not necessarily be defined, and a configuration where only the transmissive region T is defined may also be employed.

As shown in FIG. 6, the CF substrate 3 includes an insulating substrate 21 such as a glass substrate, a color filter layer 22 disposed on the insulating substrate 21, and a transparent layer 23 disposed in the reflective region R of the color filter layer 22 so as to offset the optical path difference between the reflective region R and the transmissive region T. The CF substrate 3 also includes the common electrode 24 disposed so as to cover the transmissive region T and the transparent layer 23 (that is, reflective region R) of the color filter layer 22, a photo spacer 25 disposed in a columnar shape on the common electrode 24, and an alignment film 26 disposed so as to cover the common electrode 24 and the photo spacer 25. The color filter layer 22 includes colored layers 28 of red layers R, green layers G, and blue layers B that are disposed so as to correspond to the pixels, respectively, and a black matrix 27 that is a light-shielding film.

The transflective liquid crystal display device 1 having the above-mentioned configuration is configured such that, in the reflective region R, light entering from the CF substrate 3 side reflects off the reflective electrode 35, and in the transmissive region T, light from a backlight (not shown) entering from the TFT substrate 2 side passes through.

In the liquid crystal display device 1, display signals (data signals) corresponding to display states of the respective pixels 30 to 32 are provided to the source bus lines 14 by a not-shown data signal line driver mean (source driver). Also, in the liquid crystal display device 1, scanning signals (gate signals) that turn the TFTs 5 on or off are provided to the gate bus lines 11 by a not-shown scanning signal line driver mean (gate driver).

The liquid crystal display device 1 is configured as follows: in the pixels 30 to 32 provided with the respective pixel electrodes 19, when the TFTs 5 are turned to the ON state by the gate signals sent from the gate bus lines 11, the data signals from the source bus lines 14 are sent to the pixel electrodes 19 through the source electrodes 18 and the drain electrodes 20, thereby writing a prescribed electrical charge in the pixel electrodes 19. This creates a difference in potential between the pixel electrodes 19 and the common electrode 24, and as a result, a prescribed voltage is applied to the liquid crystal layer 4. The orientation state of the liquid crystal molecules is changed in accordance with an amount of the applied voltage, and by utilizing such characteristics, the liquid crystal display device 1 adjusts the transmittance of incoming light from the backlight, and therefore displays images.

In this embodiment, as shown in FIGS. 3 to 5, the pixel electrode 19a for the pixel 31 is disposed in the pixel 30 that is another pixel adjacent to the pixel 31, and the gate bus line 11b disposed in the pixel 31 and the pixel electrode 19a for the pixel 31 that is disposed in the pixel 30 are arranged apart from each other so as not to overlap in a plan view.

In a manner similar to above, the pixel electrode 19b for the pixel 32 is disposed in the pixel 31 that is another pixel adjacent to the pixel 32, and the gate bus line 11c disposed in the pixel 32 and the pixel electrode 19b for the pixel 32 that is disposed in the pixel 31 are arranged apart from each other so as not to overlap in a plan view.

In this case, as shown in FIG. 5, a parasitic capacitance $C_{gd2}$ is formed between the pixel electrode 19b disposed in the pixel 31 (that is, the pixel electrode for the pixel 32) and the gate bus line 11b, and even though the parasitic capacitance $C_{gd2}$ increases, the parasitic capacitance $C_{gd1}$ between the pixel electrode 19a disposed in the pixel 30 and the gate bus line 11b can be reduced.

That is, in the pixel 31, when the data signal is applied to the source bus line 14, and when the voltage of the scanning signal lowers from the ON voltage $V_{gh}$ of the gate bus line 11b to the OFF voltage $V_{g1}$ of the gate bus line 11b, the parasitic capacitance $C_{gd2}$ between the pixel electrode 19b disposed in the pixel 31 and the gate bus line 11b is large. However, as described above, because the gate bus line 11b disposed in the pixel 31 and the pixel electrode 19a for the pixel 31 are arranged apart from each other so as not to overlap in a plan view, the parasitic capacitance $C_{gd2}$ has no effect on the pixel 31, and it allows for the reduction in the parasitic capacitance $C_{gd1}$.

The parasitic capacitance $C_{gd1}$ is reduced with increase in the parasitic capacitance $C_{gd2}$. This is because, as shown in FIG. 7, a relationship represented by $d_1 > d_2$ is satisfied in the pixel 31, where $d_1$ is a distance between the pixel electrode 19a for the pixel 31 that is disposed in the adjacent pixel 30 and the gate bus line 11b, and $d_2$ is a distance between the pixel electrode 19b disposed in the pixel 31 and the gate bus line 11b.

Generally, an electrostatic capacitance can be represented by $\epsilon S/d$ ($\epsilon$: electrostatic capacitance, S: area where gate bus line and pixel electrode overlap, and d: distance between gate bus line and pixel electrode), and therefore, the parasitic capacitance $C_{gd1}$ between the pixel electrode 19a for the pixel 31 and the gate bus line 11b (that is, $\epsilon S/d_1$) becomes smaller than the parasitic capacitance $C_{gd2}$ between the pixel electrode 19b disposed in the pixel 31 and the gate bus line 11b (that is, $\epsilon S/d_2$).

In this case, the feed-through voltage $\Delta V_d$ of the pixel electrode 19a is represented by the following formula:

$$\Delta V_d = (V_{gh} - V_{g1}) \cdot C_{gd1} / (C_{1c} + C_s + C_{gd1} + C_{gd2}) \quad (2)$$

Thus, as described above, even though the parasitic capacitance $C_{gd2}$ is increased, the parasitic capacitance $C_{gd1}$ is reduced, and therefore, from Formula (2) above, it is possible to reduce the feed-through voltage $\Delta V_d$ of the pixel electrode 19a for the pixel 31. As a result, it becomes possible to prevent degradation of display quality caused by flickering.

That is, by satisfying the above-mentioned condition $d_1 > d_2$, the parasitic capacitance $C_{gd1}$ can be reduced reliably, which makes it possible to reliably reduce the feed-through voltage $\Delta V_d$ of the pixel electrode 19a for the pixel 31.

The present invention differs from the above-mentioned conventional technique in that there is no need to provide conductive layers around the pixel electrodes, and it only requires a modification to wiring lines in the pixels. This makes it possible to prevent degradation of display quality caused by flickering without reducing the aperture ratio or increasing the cost.

As shown in FIGS. 3 and 4, in the pixel 32 as well, by employing a configuration similar to that of the pixel 31 above, the feed-through voltage $\Delta V_d$ of the pixel electrode 19b for the pixel 32 can be reduced, and therefore, it becomes possible to prevent degradation of display quality caused by flickering. That is, as shown in FIGS. 3 and 4, the pixel 32 may be configured such that the pixel electrode 19b for the pixel 32 is disposed in the pixel 31 that is another pixel adjacent to the pixel 32, and that the gate bus line 11c and the pixel electrode 19b for the pixel 32 disposed in the pixel 31 are arranged apart from each other so as not to overlap in a plan view.

Embodiment 2

Next, Embodiment 2 of the present invention will be explained. An overall configuration of a liquid crystal display device and an overall configuration of a TFT substrate are similar to those described in Embodiment 1 above, and therefore, the detailed explanations thereof will be omitted. Also, the same reference characters will be given to the same constituting elements as those in Embodiment 1 above, and the explanations thereof will be omitted.

Figure 8:
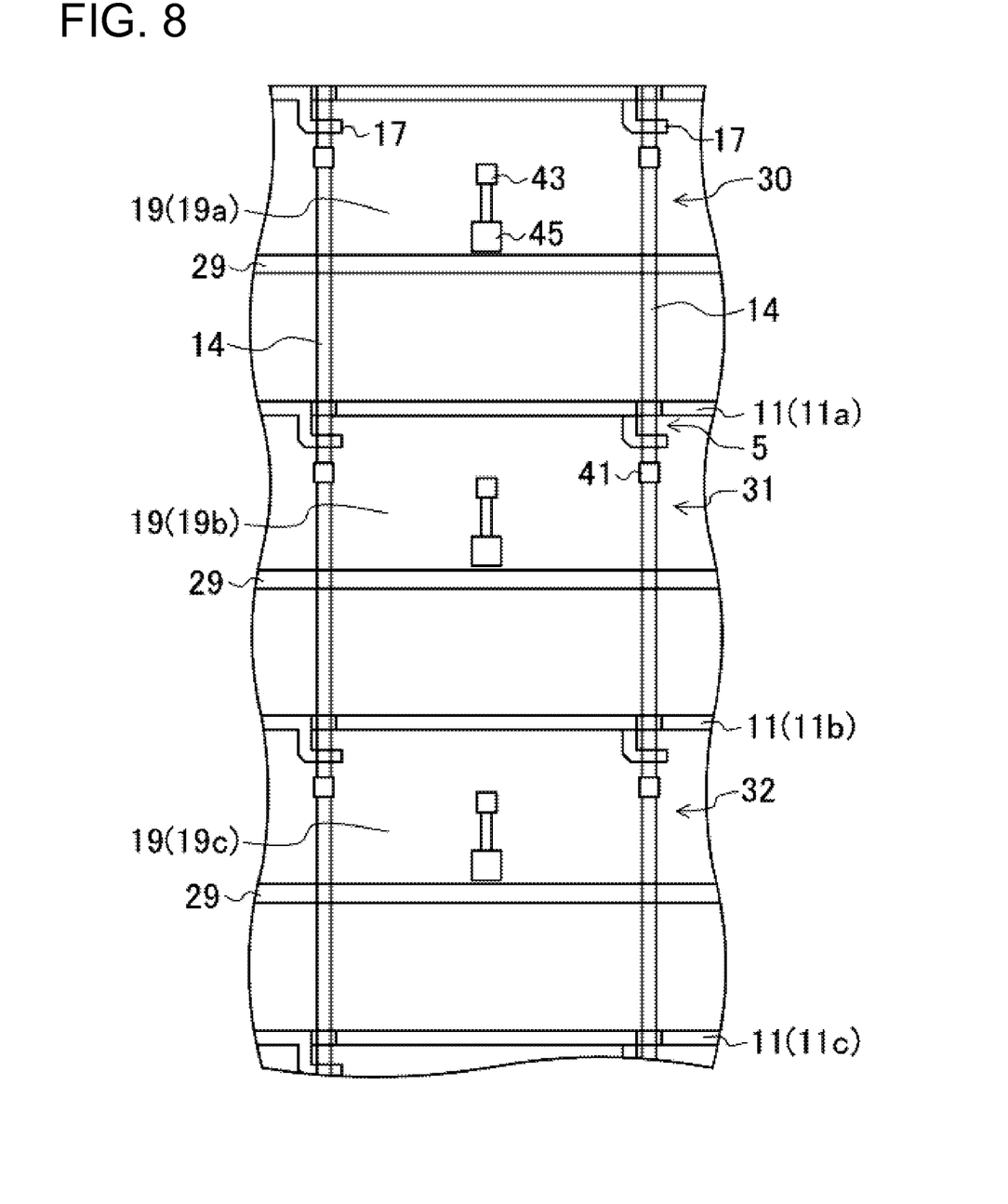
FIG. 8 is a plan view showing adjacent pixels in a liquid crystal display device according to Embodiment 2 of the present invention.
Figure 9:
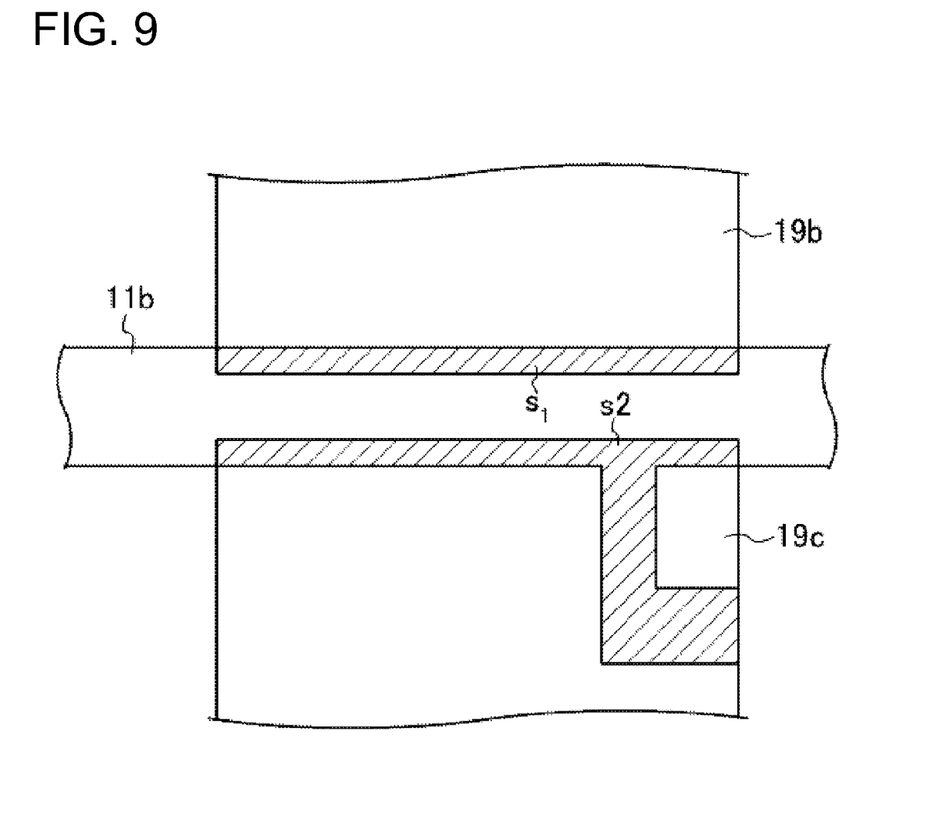
FIG. 9 is a plan view for explaining areas where a gate bus line and pixel electrodes overlap in the liquid crystal display device according to Embodiment 2 of the present invention.
Figure 10:
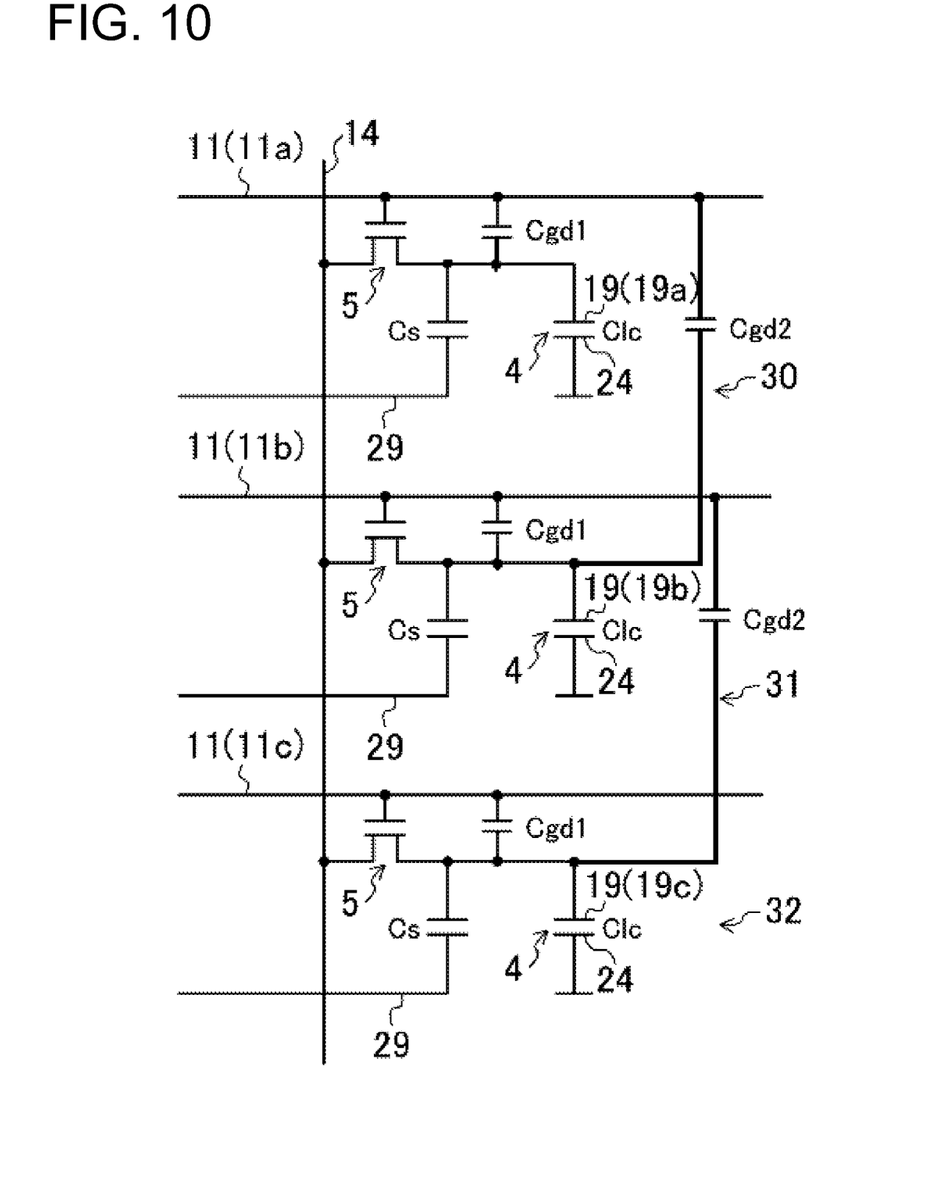
FIG. 10 is an equivalent circuit diagram showing an electrical configuration of adjacent pixels in the liquid crystal display device according to Embodiment 2 of the present invention.

FIG. 8 is a plan view showing adjacent pixels in a liquid crystal display device according to Embodiment 2 of the present invention. FIG. 9 is a plan view for explaining areas where a gate bus line and pixel electrodes overlap in the liquid crystal display device according to Embodiment 2 of the present invention. FIG. 10 is an equivalent circuit diagram showing an electrical configuration of adjacent pixels in the liquid crystal display device according to Embodiment 2 of the present invention.

This embodiment differs from Embodiment 1 above in that, as shown in FIG. 8, the gate bus lines 11 are configured to be arranged between the respective adjacent pixels. As shown in FIGS. 8 and 9, in this embodiment, areas where the gate bus lines 11 respectively overlap the pixel electrodes of the two pixels adjacent to the respective gate bus lines 11 (that is, the two pixel electrodes 19b and 19c that sandwich the gate bus line 11) differ from each other in a plan view.

Specifically, as shown in FIGS. 8 and 9, this embodiment is configured to satisfy the relationship represented by $S_1 < S_2$, where $S_1$ is an area in which the gate bus line 11b of the pixel 31 overlaps the pixel electrode 19b of the pixel 31, and $S_2$ is an area in which the gate bus line 11 of the pixel 31 overlaps the pixel electrode 19c of the pixel 32 adjacent to the pixel 31.

As described above, generally, the electrostatic capacitance can be represented by $\epsilon S/d$, and therefore, the parasitic capacitance $C_{gd1}$ between the pixel electrode 19b of the pixel 31 and the gate bus line 11b (that is, $\epsilon S_1/d$) becomes smaller than the parasitic capacitance $C_{gd2}$ between the pixel electrode 19c of the pixel 32 and the gate bus line 11b (that is, $\epsilon S_2/d$).

That is, in a manner similar to Embodiment 1 above, as shown in FIG. 10, the parasitic capacitance $C_{gd2}$ is formed between the pixel electrode 19c and the gate bus line 11b, and even though the parasitic capacitance $C_{gd2}$ increases, the parasitic capacitance $C_{gd1}$ between the pixel electrode 19b disposed in the pixel 31 and the gate bus line 11b can be reduced.

That is, in the pixel 31, when the data signal is applied to the source bus line 14, and when the voltage of the scanning signal lowers from the ON voltage $V_{gh}$ of the gate bus line 11b to the OFF voltage $V_{gl}$ of the gate bus line 11b, the parasitic capacitance $C_{gd2}$ between the pixel electrode 19c of the pixel 32 that is another pixel and the gate bus line 11b is large. However, this parasitic capacitance $C_{gd2}$ has no effect on the pixel 31, and it allows for the reduction in the parasitic capacitance $C_{gd1}$.

Thus, as described above, even though the parasitic capacitance $C_{gd2}$ is increased, the parasitic capacitance $C_{gd1}$ is reduced, and therefore, from Formula (2) above, it is possible to reduce the feed-through voltage $\Delta V_d$ of the pixel electrode 19b. As a result, it becomes possible to prevent degradation of display quality caused by flickering.

That is, by satisfying the above-mentioned condition $S_1 < S_2$, the parasitic capacitance $C_{gd1}$ can be reduced reliably, which makes it possible to reliably reduce the feed-through voltage $\Delta V_d$ of the pixel electrode 19b of the pixel 31.

The present invention differs from the above-mentioned conventional technique in that there is no need to provide conductive layers around the pixel electrodes, and it only requires a modification to wiring lines in the pixels. This makes it possible to prevent degradation of display quality caused by flickering without reducing the aperture ratio or increasing the cost.

As shown in FIG. 8, in the pixels 30 and 32 as well, by employing a configuration similar to that of the pixel 31 above, the feed-through voltage $\Delta V_d$ of the pixel electrodes 19a and 19c of the pixels 30 and 32, respectively, can be reduced, and therefore, it becomes possible to prevent degradation of display quality caused by flickering. That is, the pixel 30 may be configured such that an area where the gate bus line 11a of the pixel 30 overlaps the pixel electrode 19a of the pixel 30 becomes smaller than an area where the gate bus line 11a of the pixel 30 overlaps the pixel electrode 19b of the pixel 31 that is adjacent to the pixel 30, for example.

INDUSTRIAL APPLICABILITY

An application example of the present invention includes an active matrix type liquid crystal display device that uses switching elements such as thin film transistors.

DESCRIPTION OF REFERENCE CHARACTERS 1 liquid crystal display device
2 TFT substrate
3 CF substrate
4 liquid crystal layer
5 TFT (switching element)
11 gate bus line (scanning signal line)
14 source bus line (data signal line)
19 pixel electrode
24 common electrode
29 auxiliary capacitance line
30 to 32 pixels
$d_1$ distance between pixel electrode and gate bus line
$d_2$ distance between pixel electrode and gate bus line
$S_1$ area where gate bus line and pixel electrode overlap
$S_2$ area where gate bus line and pixel electrode overlap

The invention claimed is:

1. A liquid crystal display device, comprising:
a plurality of data signal lines;
a plurality of scanning signal lines that cross the plurality of data signal lines;
a plurality of auxiliary capacitance lines that extend in parallel with the scanning signal lines;
a plurality of pixels each including a switching element that turns to an ON state when the scanning signal line is in a selected state and that turns to an OFF state when the scanning signal line is in a non-selected state, and a pixel electrode connected to the data signal line through the switching element, the plurality of pixels being arranged in a matrix so as to correspond to respective intersections of the plurality of data signal lines and the plurality of scanning signal lines;
a common electrode disposed so as to face the pixel electrodes; and
a liquid crystal layer sandwiched by the pixel electrodes and the common electrode,
wherein the pixel electrode for a first pixel among the plurality of pixels is disposed in a second pixel that is adjacent to the first pixel, so that the scanning signal line disposed in the first pixel and said pixel electrode for the first pixel are arranged apart from each other so as not to overlap in a plan view, and
wherein a relationship represented by $d_1 > d_2$ is satisfied, where $d_1$ is a distance between the scanning signal line disposed in the first pixel and the pixel electrode disposed in the second pixel, and $d_2$ is a distance between said scanning signal line disposed in the first pixel and the pixel electrode disposed in the first pixel.

2. The liquid crystal display device according to claim 1, wherein the auxiliary capacitance lines are disposed between the pixels, respectively.

\* \* \* \* \*